United States Patent
Wu et al.

(10) Patent No.: US 10,079,740 B2
(45) Date of Patent: Sep. 18, 2018

(54) PACKET CAPTURE ENGINE FOR COMMODITY NETWORK INTERFACE CARDS IN HIGH-SPEED NETWORKS

(71) Applicant: Fermi Research Alliance, LLC, Batavia, IL (US)

(72) Inventors: Wenji Wu, Naperville, IL (US); Philip J. DeMar, Aurora, IL (US); Liang Zhang, Naperville, IL (US)

(73) Assignee: Fermi Research Alliance, LLC, Batavia, IL (US)

( * ) Notice: Subject to any disclaimer, the term of this patent is extended or adjusted under 35 U.S.C. 154(b) by 256 days.

(21) Appl. No.: 14/931,956

(22) Filed: Nov. 4, 2015

(65) Prior Publication Data

US 2016/0127276 A1     May 5, 2016

Related U.S. Application Data

(60) Provisional application No. 62/074,743, filed on Nov. 4, 2014.

(51) Int. Cl.
| | | |
|---|---|---|
| *G06F 13/00* | (2006.01) | |
| *H04L 12/26* | (2006.01) | |
| *H04L 12/861* | (2013.01) | |

(52) U.S. Cl.
CPC ............ *H04L 43/062* (2013.01); *H04L 43/12* (2013.01); *H04L 43/14* (2013.01); *H04L 49/90* (2013.01)

(58) Field of Classification Search
CPC ....... H04L 43/12; H04L 43/062; H04L 43/14; H04L 49/90

USPC ........ 709/224, 236, 230, 232, 234, 213, 214
See application file for complete search history.

(56) References Cited

U.S. PATENT DOCUMENTS

| | | | |
|---|---|---|---|
| 6,782,444 B1 | 8/2004 | Vishlitzky et al. | |
| 7,567,521 B2 | 7/2009 | Olgaard et al. | |
| 7,684,347 B2 | 3/2010 | Merkey et al. | |
| 7,855,974 B2 | 12/2010 | Merkey et al. | |
| 8,284,688 B2 | 10/2012 | Okada et al. | |
| 8,892,531 B2* | 11/2014 | Kaplan | G06F 17/3007 |
| | | | 707/694 |
| 9,438,668 B2* | 9/2016 | Agrawal | H04L 67/1008 |
| 2002/0173857 A1 | 11/2002 | Pabari et al. | |
| 2009/0182953 A1 | 7/2009 | Merkey et al. | |
| 2013/0086135 A1* | 4/2013 | Kaplan | G06F 17/3007 |
| | | | 707/827 |
| 2015/0058404 A1* | 2/2015 | Agrawal | H04L 67/1008 |
| | | | 709/203 |
| 2016/0323172 A1* | 11/2016 | Friend | H04L 43/028 |

OTHER PUBLICATIONS

Basu, A. et al., "Efficient Virtual Memory for Big Memory Servers," ISCA'13, Tel-Aviv, Israel Jun. 2013, 41 (3):237-248.
(Continued)

*Primary Examiner* — Kenneth R Coulter
(74) *Attorney, Agent, or Firm* — Kevin Soules; Luis M. Ortiz; Kermit D. Lopez

(57) ABSTRACT

A method, systems for a packet capture engine for commodity network interface cards (NICs) in high-speed networks that provides lossless zero-copy packet capture and delivery services by exploiting multi-queue NICs and multicore architectures. The methods, systems include a ring-buffer-pool mechanism and a buddy-group based offloading mechanism.

18 Claims, 11 Drawing Sheets

(56) References Cited

OTHER PUBLICATIONS

Benson, T. et aL, "Network Traffic Characteristics of Data Centers in the Wild," ICM '10 Proceedings of the 10th ACM SIGCOMM conference on Internet measurement (2010), pp. 267-280.
Bonelli, N. et al., "On Multi-Gigabit Packet Capturing With Multi-Core Commodity Hardware," PAM '12 Proceedings of the 13th International conference on Passive and Active Measurement (2012) pp. 64-73.
Braun, L. et aL, "Comparing and Improving Current Packet Capturing Solutions based on Commodity Hardware," IMC '10 Proceedings of the 10th ACM SIGCOMM conference on Internet measurement (2010) pp. 206-217.
Chu, H.-K. J., "Zero-Copy TCP in Solaris," ATEC '96 Proceedings of the 1996 annual conference on USENIX Annual Technical Conference, 13 pages.
Crosby, S. A. et al., "Denial of Service via Algorithmic Complexity Attacks," SSYM '03 Proceedings of the 12th Conference on USENIX Security Symposium—vol. 12, 16 pages.
DNA vs netmap, www.ntop.org/products/pf_ring/dna, 2 pages.
DPDK, DPDK website, http://dpdk.org.
Druschel, P. et al., "Lazy Receiver Processing (LRP): A Network Subsystem Architecture for Server Systems," OSDI '96 Proceedings of the second USENIX symposium on Operating Systems design and implementation (1996) ) pp. 261-275.
Dumitrescu, C. F., "Design Patterns for Packet Processing Applications on Multi-Core Intel(R) Architecture Processors," (2008), http://www.intel.com/content/www/us/en/intelligent-systems/intel-technology/ia-multicore-packet-processing-paper.html, 20 pages.
Foong, A. P. et al., "TCP Performance Re-Visited," IEEE International Symposium on Performance Analysis of Systems and Software Mar. 6-8, 2003, pp. 70-79.
Fusco, F. et al., "High Speed Network Traffic Analysis with Commodity Multi-core Systems," Proceedings of the 10th ACM SIGCOMM conference on Internet measurement (2010) pp. 218-224.
Geer, D., "Chip Makers Turn to Multicore Processors," Computer (2005) 38(5):11-13.
Han, S. et al., "PacketShader: A GPU-Accelerated Software Router," ACM SIGCOMM Computer Communication Review (2010) 40(4):195-206.
Intel 82599 10 GbE Controller Datasheet, http://www.intel.com/content/www/us/en/ethernet-controllers/82599-10-gbe-controller-datasheet.html, 1054 pages.

Jamshed, M. et al., "Kargus: A Highly-scalable Software-based Intrusion Detection System," Proceedings of the 2012 ACM Conference on Computer and Communications Security (2012) pp. 317-328.
Koch, U., "Userspace I/O drivers in a realtime context," https://www.osadl.org/fileadmin/dam/rtlws/12/Koch.pdf, 7 pages.
TCPDUMP and LIBPCAP public repository, http://www.tcpdump.org/, 2 pages.
McCanne, S. et al., "The BSD Packet Filter: A New Architecture for User-level Packet Capture," Proceedings of the USENIX Winter 1993 Conference Proceedings, 11 pages.
Mogul, J. C. et al., "Eliminating Receive Livelock in an Interrupt-Driven Kernel," ACM Transactions on Computer Systems (TOCS) (1997) 15(3):217-252.
Moreno, V. et al., "Batch to the Future: Analyzing Timestamp Accuracy of High-Performance Packet I/O Engines," IEEE Communications Letters (2012) 16(11):1888-1891.
http://www.napatech.com/, 3 pages.
Papadogiannakis, A. et al., "Improving the Accuracy of Network Intrusion Detection Systems Under Load Using Selective Packet Discarding," Proceedings of the Third European Workshop on System Security (2010) pp. 15-21.
Paxson, V., "Automated Packet Trace Analysis of TCP Implementations," ACM SIGCOMM Computer Communication Review (1997) 27(4):167-179.
PF-RING, www.ntop.org/products/pf-ring/, 3 pages.
Rizzo, L., "netmap: a novel framework for fast packet I/O," USENIX ATC '12 Proceedings of the 2012 USENIX ,conference on Annual Technical Conference (2012) 12 pages.
Roesch, M., "Snort-Lightweight Intrusion Detection for Networks," Proceedings of LISA '99: 13th Systems Administration Conference Nov. 7-12, 1999 pp. 229-238.
White, J. S. et al., "Quantitative Analysis of Intrusion Detection Systems: Snort and Suricata," Proceedings of SPIE—The International Society for Optical Engineering Apr. 2013, 14 pages.
Wu, W. et al., "The Performance Analysis of Linux Networking—Packet Receiving," Computer Communications (2007) 30(5):1044-1057.
Wu, W. et al., "Why Can Some Advanced Ethernet NICs Cause Packet Reordering?," IEEE Communication Letters (2010) 15(2):253-255.
Wu, W. et al., "A Transport-Friendly NIC for Multicore/Multiprocessor Systems," IEEE Transactions on Parallel and Distributed Systems (2011) 23(4):607-615.

\* cited by examiner

PACKET CAPTURE ENGINE FOR COMMODITY NETWORK INTERFACE CARDS IN HIGH-SPEED NETWORKS

CROSS REFERENCE TO RELATED PATENT APPLICATIONS

This patent application claims priority under 35 U.S.C. § 119(e) to, and the benefit of, U.S. provisional patent application 62/074,743, entitled "Packet Capture Engine for Commodity Network Interface Cards in High-Speed Networks", which was filed on Nov. 4, 2014. U.S. Provisional Patent Application Ser. No. 62/074,743 is incorporated herein by reference in its entirety.

STATEMENT OF GOVERNMENT RIGHTS

This invention was made with government support under contract No. DE-AC02-07CH11359 awarded by the U.S. Department of Energy. The government has certain rights in the invention.

TECHNICAL FIELD

Embodiments generally relate to the field of computer technology. Embodiments also relate to the transmission of data between processing devices such as computers. Specifically, the embodiments provide a novel packet capture engine for commodity network interface cards (NICs) in high-speed networks designed to support packet capture and processing.

BACKGROUND

Packet capture is an essential function for many network applications, including intrusion detection systems and packet-based network performance analysis applications. Packets are typically captured from the wire, temporarily stored at a data capture buffer, and finally delivered to applications for processing. Because these operations are performed on a per-packet basis, packet capture is typically computationally and throughput intensive. In high-speed networks, packet capture faces significant performance challenges.

Packet drop is a major problem with packet capture in high-speed networks. There are two types of packet drop: packet capture drop and packet delivery drop. Packet capture drop is mainly caused by the inabilities of packet capture to keep pace with the incoming packet rate. Consequently, packets may be dropped because they cannot be captured in time.

Packet delivery drop is mainly caused by the inability of an application to keep pace with the packet capture rate. Consequently, the data capture buffer overflows and packet drops occur even when 100% of the network traffic is captured from the wire. Any type of packet drop will degrade the accuracy and integrity of network monitoring applications. Thus, there is a need in the art to avoid packet drops in packet capture tools.

There are several prior art approaches for solving this problem. One approach is to apply traffic steering to distribute the traffic evenly. However, this approach cannot preserve the application logic. Another approach involves the use of existing packet capture engines to handle load imbalance in the application layer, but an application in user space has little knowledge of low-level layer conditions and cannot effectively handle load imbalance.

Accordingly, the present embodiments provide improved methods and systems for packet capture.

BRIEF SUMMARY

The following summary is provided to facilitate an understanding of some of the innovative features unique to the embodiments disclosed and is not intended to be a full description. A full appreciation of the various aspects of the embodiments can be gained by taking the entire specification, claims, drawings, and abstract as a whole.

It is, therefore, one aspect of the disclosed embodiments to provide a method and system for data transfer between computers.

It is another aspect of the disclosed embodiments to provide a method and system for packet capture.

It is another aspect of the disclosed embodiments to provide an enhanced method and system for packet capture engines for commodity network interface cards used in high-speed networks.

It is yet another aspect of the disclosed embodiments to provide improved methods and systems for packet capture that address load balance in the packet-capture level. The embodiments provide a packet capture engine that is better able to address load imbalance because it has full knowledge of low-level layer conditions.

The aforementioned aspects and other objectives and advantages can now be achieved as described herein. Methods and systems for a method for packet capture comprises opening at least one receive queue for packet capture; capturing packets in at least one chunk in the at least one receive queue; processing the captured packets; recycling the at least one chunk associated with the captured packet for future use; and closing the receive queue. The method further comprises forming at least one buddy group comprising at least two of the receive queues wherein the buddy group is configured as an offloading mechanism for an application associated with the at least two receive queues. The method also comprises providing low-level packet capture and transmit services using a kernel-mode driver and providing an interface for low-level network access.

In another embodiment, the method further comprises assigning three modules in a user space for the at least one receiving queue comprising a capture thread, a work queue pair, and a buddy list. In an embodiment, the method further comprises accessing one of the at least one receive queue's capture queue in the user space with a packet processing thread; fetching and processing at least one packet buffer chunk in the capture queue; forwarding the modified at least one packet buffer chunk back into a network; and inserting the modified at least one packet buffer chunk into an associated recycle queue.

In another embodiment, the method further comprises determining if a queue length exceeds an offloading percentage threshold, querying a buddy queue list, and placing the at least one packet buffer chunk into a capture queue of a less busy capture thread.

In yet another embodiment, the method comprises handling each of the at least one receive queues independently in a basic mode. The at least one chunk comprises at least one of a free chunk; an attached chunk; and a captured chunk.

BRIEF DESCRIPTION OF THE DRAWINGS

The accompanying figures, in which like reference numerals refer to identical or functionally-similar elements throughout the separate views and which are incorporated in and form a part of the specification, further illustrate the embodiments and, together with the detailed description, serve to explain the embodiments disclosed herein.

DETAILED DESCRIPTION

The embodiments will now be described more fully hereinafter with reference to the accompanying drawings, in which illustrative embodiments of the invention are shown. The embodiments disclosed herein can be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout. As used herein, the term "and/or" includes any and all combinations of one or more of the associated listed items.

The particular values and configurations discussed in these non-limiting examples can be varied and are cited merely to illustrate one or more embodiments and are not intended to limit the scope thereof.

The terminology used herein is for the purpose of describing particular embodiments only and is not intended to be limiting of the invention. As used herein, the singular forms "a", "an", and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Figure 1:
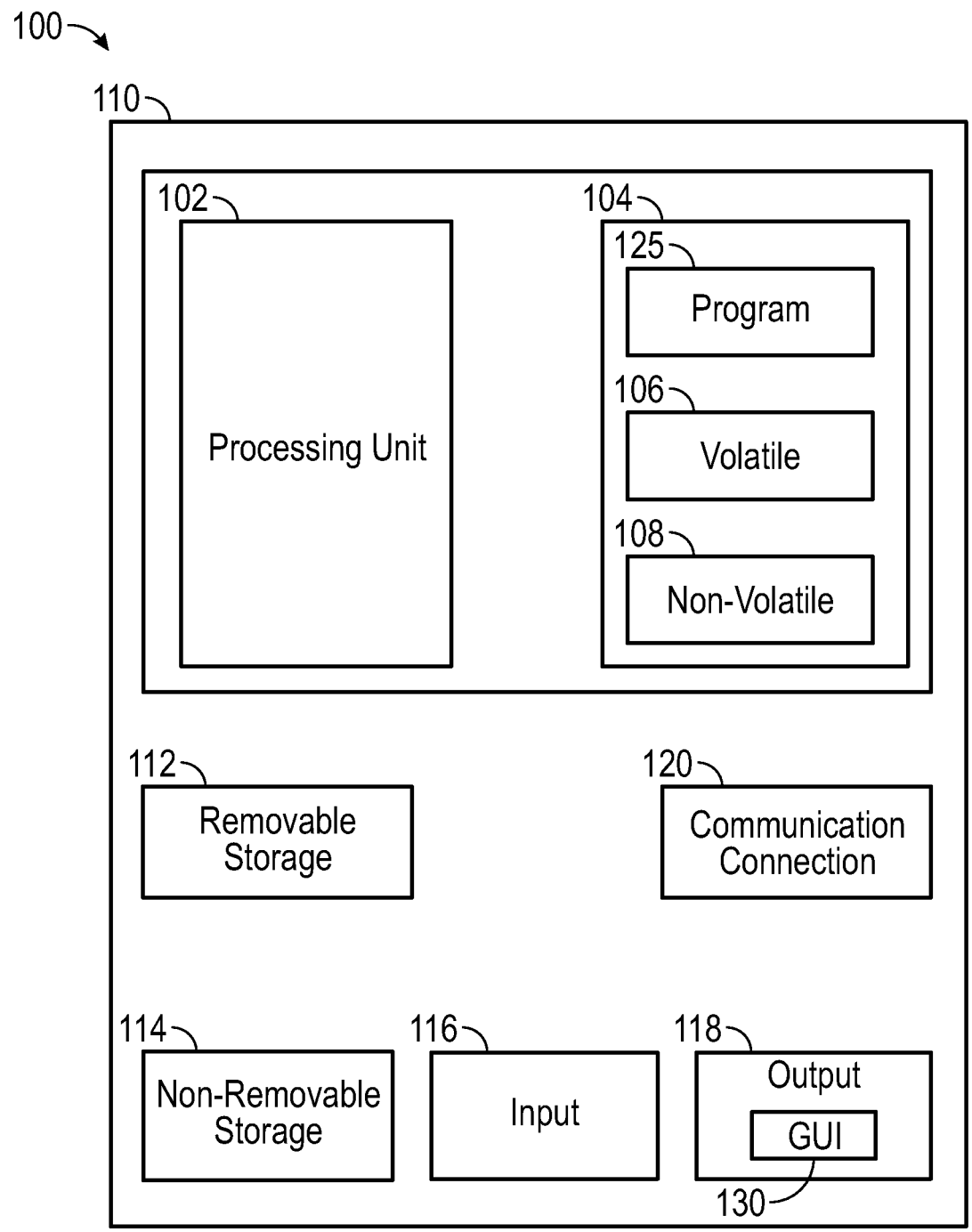
FIG. 1 depicts a block diagram of a computer system which is implemented in accordance with the disclosed embodiments.
Figure 2:
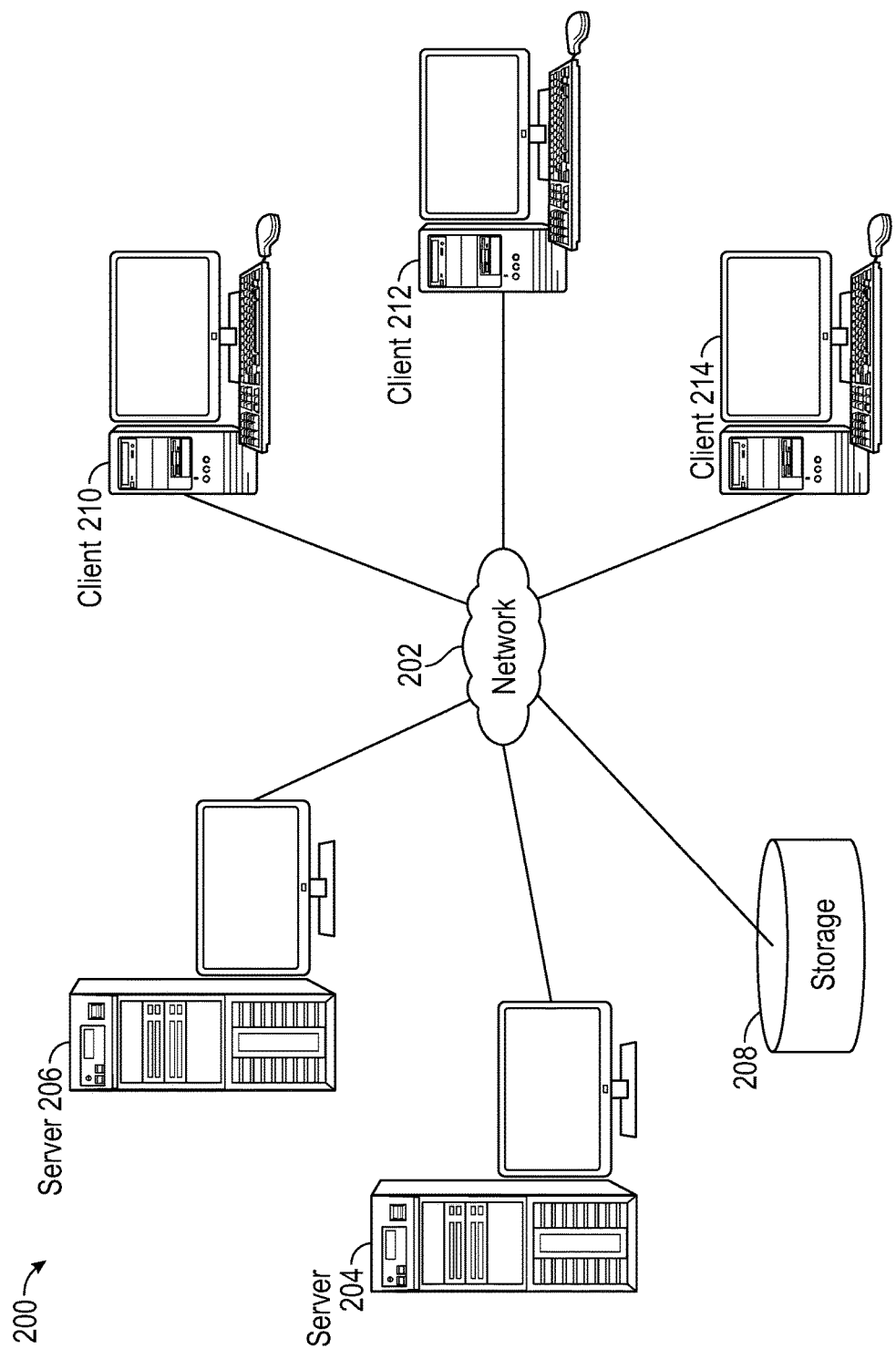
FIG. 2 depicts a graphical representation of a network of data-processing devices in which aspects of the present invention may be implemented.

FIGS. 1-2 are provided as exemplary diagrams of data-processing environments in which embodiments of the present invention may be implemented. It should be appreciated that FIGS. 1-2 are only exemplary and are not intended to assert or imply any limitation with regard to the environments in which aspects or embodiments of the disclosed embodiments may be implemented. Many modifications to the depicted environments may be made without departing from the spirit and scope of the disclosed embodiments.

A block diagram of a computer system 100 that executes programming for implementing the methods and systems disclosed herein is shown in FIG. 1. A general computing device in the form of a computer 110 may include a processing unit 102, memory 104, removable storage 112, and non-removable storage 114. Memory 104 may include volatile memory 106 and non-volatile memory 108. Computer 110 may include or have access to a computing environment that includes a variety of transitory and non-transitory computer-readable media such as volatile memory 106 and non-volatile memory 108, removable storage 112 and non-removable storage 114. Computer storage includes, for example, random access memory (RAM), read only memory (ROM), erasable programmable read-only memory (EPROM) and electrically erasable programmable read-only memory (EEPROM), flash memory or other memory technologies, compact disc read-only memory (CD ROM), Digital Versatile Disks (DVD) or other optical disk storage, magnetic cassettes, magnetic tape, magnetic disk storage, or other magnetic storage devices, or any other medium capable of storing computer-readable instructions as well as data.

Computer 110 may include or have access to a computing environment that includes input 116, output 118, and a communication connection 120. The computer may operate in a networked environment using a communication connection to connect to one or more remote computers or devices. The computer may have a commodity network interface card. The remote computer may include a personal computer (PC), server, router, network PC, a peer device or other common network node, or the like. The communication connection may include a Local Area Network (LAN), a Wide Area Network (WAN), or other networks. This functionality is described in more fully in the description associated with FIG. 2 below.

Output 118 is most commonly provided as a computer monitor, but may include any computer output device. Output 118 may also include a data collection apparatus associated with computer system 100. In addition, input 116, which commonly includes a computer keyboard and/or pointing device such as a computer mouse, computer track pad, or the like, allows a user to select and instruct computer system 100. A user interface can be provided using output 118 and input 116. Output 118 may function as a display for displaying data and information for a user and for interactively displaying a graphical user interface (GUI) 130.

Note that the term "GUI" generally refers to a type of environment that represents programs, files, options, and so forth by means of graphically displayed icons, menus, and dialog boxes on a computer monitor screen. A user can interact with the GUI to select and activate such options by directly touching the screen and/or pointing and clicking with a user input device 116 such as, for example, a pointing device such as a mouse and/or with a keyboard. A particular item can function in the same manner to the user in all applications because the GUI provides standard software routines (e.g., module 125) to handle these elements and report the user's actions.

Computer-readable instructions, for example, program module 125, which can be representative of other modules described herein, are stored on a computer-readable medium and are executable by the processing unit 102 of computer 110. Program module 125 may include a computer application. A hard drive, CD-ROM, RAM, Flash Memory, and a USB drive are just some examples of articles including a computer-readable medium.

Computer system 100 can function as a computing device capable of sending or receiving signals through a wired or a wireless network such as, for example, networks 202, depicted in FIG. 2. Computer system 100 may implemented as, for example, a desktop computer, a server, or a portable device, such as a cellular telephone, a Smartphone, a display pager, a radio frequency (RF) device, an infrared (IR) device, a Personal Digital Assistant (PDA), a handheld computer, a tablet computer, a laptop computer, a set top box, a wearable computer, or an integrated device combining various features, such as features of the forgoing devices, or the like.

FIG. 2 depicts a graphical representation of a network of data-processing systems 200 in which aspects of the present invention may be implemented. Network data-processing system 200 is a network of computers in which embodiments of the present invention may be implemented. Note that the system 200 can be implemented in the context of a software module such as program module 125. The system 200 includes a network 202 in communication with one or more clients 210, 212, and 214. Network 202 is a medium that can be used to provide communications links between various devices and computers connected together within a networked data processing system such as computer system 100. Network 202 may include connections such as wired communication links, wireless communication links such as cloud based connection, or fiber optic cables. Network 202 can further communicate with one or more servers 204 and 206, and a memory storage unit such as, for example, memory or database 208.

In the depicted example, servers 204 and 206 connect to network 202 along with storage unit 208. In addition, clients 210, 212, and 214 connect to network 202. These clients 210, 212, and 214 may be, for example, personal computers or network computers. Computer system 100 depicted in FIG. 1 can be, for example, a client such as client 210, 212, and/or 214.

Computer system 100 can also be implemented as a server such as server 206, depending upon design considerations. In the depicted example, server 206 provides data such as boot files, operating system images, applications, and application updates to clients 210, 212, and 214. Clients 210, 212, and 214 are clients to server 206 in this example. Network data-processing system 200 may include additional servers, clients, and other devices not shown. Specifically, clients may connect to any member of a network of servers, which provide equivalent content.

In the depicted example, network data-processing system 200 is the Internet with network 202 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers consisting of thousands of commercial, government, educational, and other computer systems that route data and messages. Of course, network data-processing system 200 may also be implemented as a number of different types of networks such as, for example, an intranet, a local area network (LAN), or a wide area network (WAN). FIGS. 1 and 2 are intended as examples and not as architectural limitations for different embodiments of the present invention.

Generally, program modules (e.g., module 125) can include, but are not limited to, routines, subroutines, software applications, programs, objects, components, data structures, etc., that perform particular tasks or implement particular abstract data types and instructions. Moreover, those skilled in the art will appreciate that the disclosed method and system may be practiced with other computer system configurations such as, for example, hand-held devices, multi-processor systems, data networks, microprocessor-based or programmable consumer electronics, networked personal computers, minicomputers, mainframe computers, servers, and the like.

Note that the term module as utilized herein may refer to a collection of routines and data structures that perform a particular task or implements a particular abstract data type. Modules may be embodied as hardware or software. Modules may be composed of two parts: an interface, which lists the constants, data types, variable, and routines that can be accessed by other modules or routines; and an implementation, which is typically private (accessible only to that module) and which includes source code that actually implements the routines in the module. The term module may also simply refer to an application such as a computer program designed to assist in the performance of a specific task such as word processing, accounting, inventory management, load origination, loan risk analysis, etc.

The following description is presented with respect to embodiments of the present invention, which can be embodied in the context of a data-processing system such as computer system 100 in conjunction with program module 125, data-processing system 200, and network 202 depicted in FIGS. 1-2. The present invention, however, is not limited to any particular application or any particular environment. Instead, those skilled in the art will find that the system and method of the present invention may be advantageously applied to a variety of system and application software including database management systems, word processors, and the like. Moreover, the present invention may be embodied on a variety of different platforms including Macintosh, UNIX, LINUX, and the like. Therefore, the descriptions of the exemplary embodiments, which follow, are for purposes of illustration and not considered a limitation.

The particular values and configurations discussed in these non-limiting examples can be varied and are cited merely to illustrate at least one embodiment and are not intended to limit the scope thereof. Various modifications to the preferred embodiments, disclosed herein, will be readily apparent to those.

A network packet is a formatted unit of data carried by a packet-switched network. Computer communications that do not support packets transmit data as a bit stream. When data is formatted into packets, the bandwidth of the communication means can be better shared among users than if the network were circuit switched. A packet includes two types of data: control information and user data or "payload." The control information provides delivery data such as source and destination network addresses, error detection codes, and sequencing information.

There are two approaches to performing packet capture on a computer device such as computer system 100. The first approach is to use a dedicated packet capture card to perform the function in hardware. This approach requires the least amount of central processing unit (CPU) intervention, thus saving the CPU for packet processing. A dedicated packet capture card can ensure that 100% of the network packets are captured and delivered to applications without loss. However, this approach demands custom hardware solutions, which tend to be more costly, relatively inflexible, and not very scalable.

An alternative approach is to use a commodity system with a commodity network interface card (NIC) to perform packet capture. In this approach, the commodity NIC is put into promiscuous mode to intercept network packets. A packet capture engine (embodied as a software driver) receives the intercepted packets and provides support to allow user-space applications to access the captured packets. This capture solution depends mainly on the software-based packet capture engine, which is flexible and cost-effective, but requires significant system CPU and memory resources. Therefore, this solution is not suitable for resource-limited systems where resource competition between packet capture and packet processing might lead to drops. However, recent technological advances in multicore platforms and multi-queue NICs have increased the availability of system CPU resources and I/O throughputs.

Figure 3:
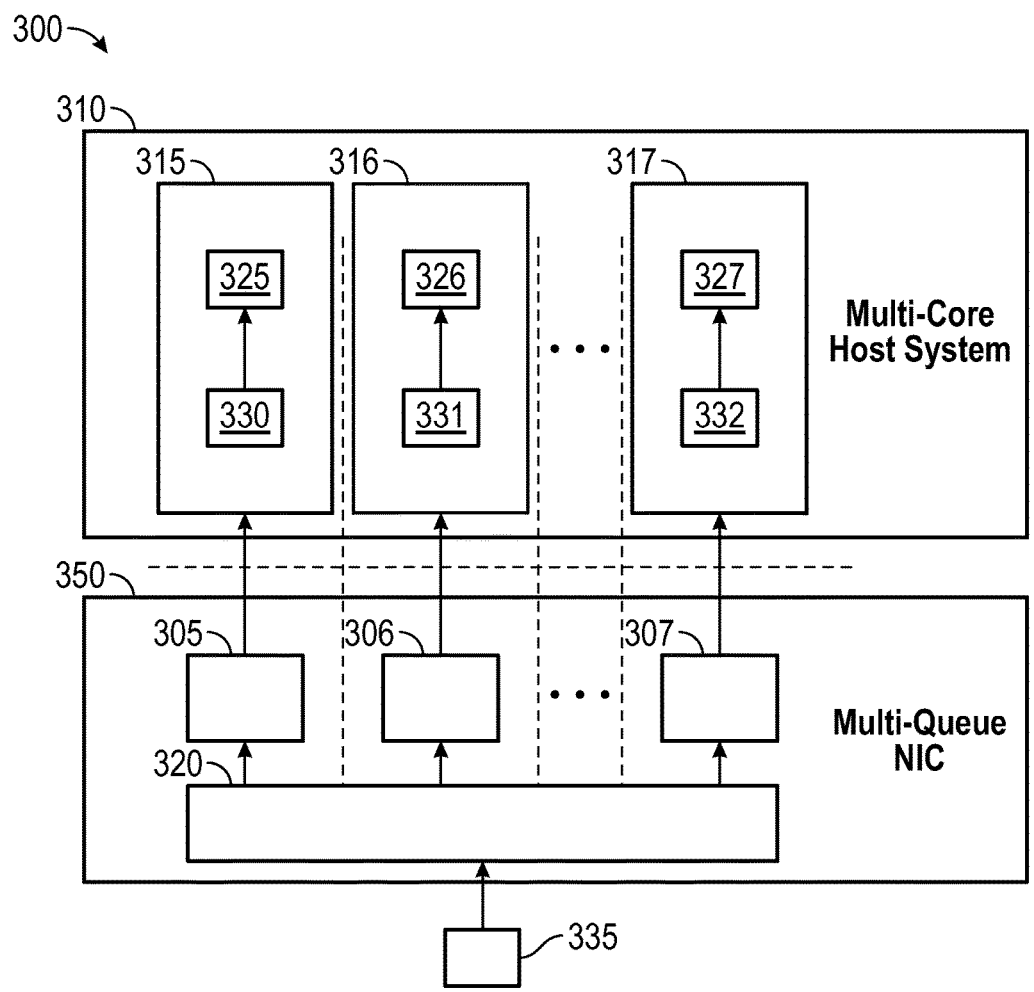
FIG. 3 depicts a packet capturing and processing system in accordance with an exemplary embodiment.

FIG. 3 illustrates packet capturing and processing system 300. The system 300 includes a multi-queue NIC 350 that is logically partitioned into n receive queues ("RQs") 305, 306, and 307, with each queue tied to a distinct core 315, 316, and 317 of a multicore host system 310. The Multi-Queue NIC 350 receives network traffic 335 in the form of packets which are distributed across the queues 305, 306, and 307 using a hardware-based traffic-steering mechanism 320. This may include receive-side scaling (RSS) or other such known scaling.

A thread (or process), such as thread 325, 326, and/or 327, of a packet-processing application runs on each core that has a tied queue. For example, thread 325 runs on core 315 that has tied queue 305. Each thread 325, 326, and/or 327 captures packets via a packet capture engine 330, 331, and/or 332 and thus handles a portion of the overall traffic. On a multicore system, there are several programming models (e.g., the run-to-completion model and the pipeline model) for a packet-processing application. The application may be of any type.

The embodiment illustrated in FIG. 3 exploits the computing parallelism of multi-core systems, such as multi-core host system 310, and the inherent data parallelism of network traffic 335 to accelerate packet capturing and processing. In a preferred embodiment, the hardware-based balancing mechanism 320 is configured to evenly distribute the incoming traffic 335 among cores 315, 316, and 317. It should be understood that an integer n number of cores may be used. Thus, each core would handle 1/n of the overall traffic and the packet rate at each core would be reduced to 1/n of the overall packet rate from the network with a significantly reduced chance of causing a packet drop.

In an embodiment, an NIC's 350 traffic-steering mechanism 320 distributes packets to cores 315, 316, and 317 based on a per-flow policy that assigns packets of the same flow to the same core. A flow is defined by one or more fields of an IP 5-tuple. Such a traffic-steering mechanism 320 maintains core affinity in network processing, helping to preserve application logic (i.e., packets belonging to the same flow must be delivered to the same application). However, this method of traffic steering can lead to a load imbalance condition in which certain cores become overloaded while others remain idle. In the worst-case scenario, a single core will be flooded with all the network traffic at wire speed.

There are two types of load imbalance. The first type is a short-term load imbalance on one or several cores. In this situation, an overloaded core experiences bursts of packets on a short scale. Here, "short" may refer to time intervals from 0-500 milliseconds.

The second type of load imbalance is a long-term load imbalance, which may be due to an uneven distribution of flow groups in an NIC. Load imbalance of both types occurs frequently on multicore systems. Existing packet capture engines (e.g., PF_RING; NETMAP, and DNA) can suffer significant packet drops when they experience load imbalance of either type in a multicore system, due to one or several of the following limitations: inability to capture packets at wire speed, limited buffering capability, and lack of an effective offloading mechanism to address long-term load imbalance.

The embodiments disclosed herein provide a new packet-capture engine that addresses load balance in the packet-capture level to avoid packet loss. The embodiments provide a packet capture engine that is in a better position to address load imbalance because it has full knowledge of low-level layer conditions.

In one embodiment, a novel packet capture engine for commodity NICs in high-speed networks supports the packet capturing and processing system 300 shown in FIG. 3. The invention can be embodied as a network interface card (NIC) ring buffer management method and system for computer packet capture engines to eliminate packet losses caused by short-term load imbalance, and to enable zero-copy packet delivery.

Figure 4:
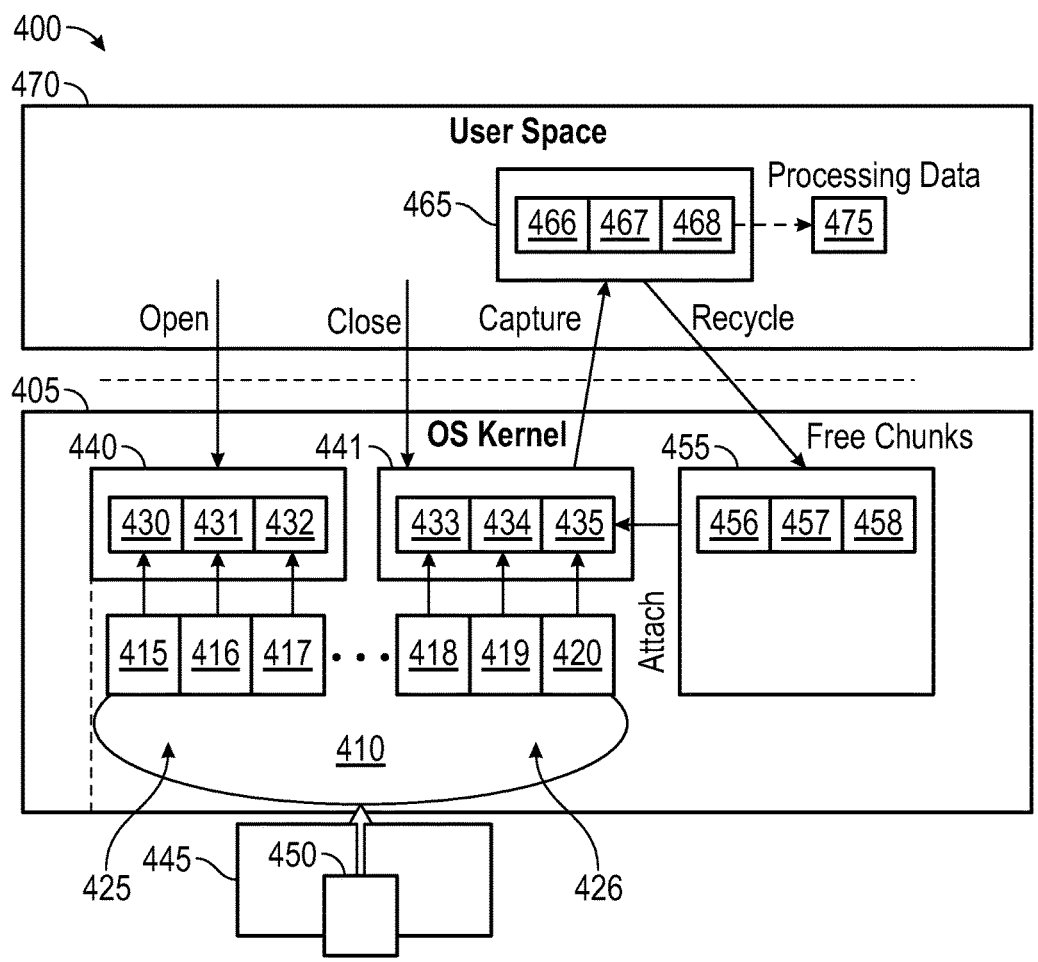
FIG. 4 depicts a block diagram of a ring-buffer-pool in accordance with an exemplary embodiment.

The ring-buffer-pool mechanism eliminates ingest packet loss caused by short-term packet burst and enables zero-copy packet delivery. FIG. 4 illustrates a block diagram of a ring-buffer-pool 400 concept in accordance with an embodiment. Assume each receive queue 445 has a ring of N descriptors where N is any number. Each receive ring 410 is divided into descriptor segments 425 and 426. A descriptor segment consists of M receive packet descriptors 415, 416, 417, 418, 419, and 420 (e.g., 1024), where M is an integer divisor of N. In kernel space 405, each receive ring 410 is allocated with an integer number R packet buffer chunks 440 and 441, termed the ring buffer pool. In this case, R is a number greater than N/M, which is meant to provide a large ring buffer pool. A packet buffer chunk consists of M fixed-size cells, with each cell corresponding to a ring buffer. For example, packet buffer chunk 440 includes cells 430, 431, 432, and packet buffer chunk 441 includes cells 433, 434, and 435. Typically, the M ring buffers within a packet buffer chunk occupy physically contiguous memory. Both M and R are configurable.

Within a pool, a packet buffer chunk, such as packet buffer chunk 440 or 441 is identified by a unique chunk_id.

Globally, a packet buffer chunk is uniquely identified by an {nic_id, ring_id, chunk_id} tuple. In the present example, nic_id and ring_id refer to the NIC and to the receive ring that the packet buffer chunk belongs to.

When an application opens a receive queue 445 to capture incoming packets 450, the ring buffer pool for the receive queue 445 will be mapped into the application's process space. Therefore, a packet buffer chunk has three addresses: DMA_address, kernel_address, and process_address, which are used by the NIC, the kernel, and the application, respectively. These addresses are maintained and translated by the kernel. A cell within a chunk is accessed by its relative address within the chunk.

A packet buffer chunk can exist in one of three states: "free", "attached", and "captured". A "free" chunk, such as chunk 455, is maintained in the kernel 405, available for use and/or reuse. The free chunk 455 includes cells 456, 457, and 458. In an "attached" state (for example, chunk 441) the chunk is attached to a descriptor segment (for example, 426) in its receive ring 410 to receive packets such as packet 450. Each cell 433, 434, and 435 in the "attached" chunk 441 is sequentially tied to the corresponding packet descriptor 418, 419, and 420, respectively, in the descriptor segment 426. A "captured" chunk 465 includes cells 466, 467, and 468, and is filled with received packets and captured into the user space 470 for processing of data 475.

Figure 5:
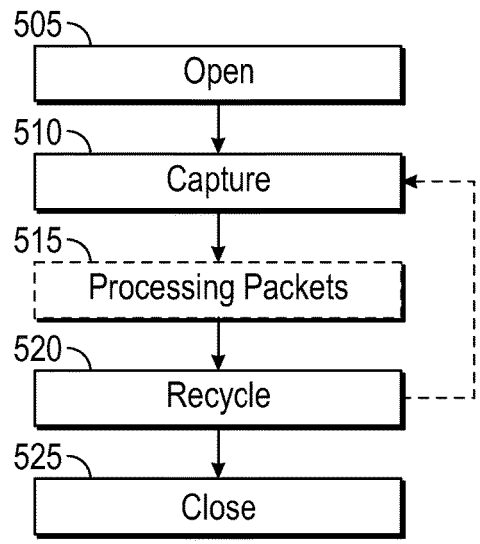
FIG. 5 depicts a block diagram of operations that can be accessed through an input/output control in accordance with an exemplary embodiment.

A ring-buffer-pool 400 provides operations to allow a user-space application to capture packets. These operations can be accessed through an input/output control (ioctl) interface. These operations are illustrated in FIG. 5.

Open 505 opens a specific receive queue for packet capture. It maps its ring buffer pool into the application's process space and attaches each descriptor segment in the receive ring with a "free" packet buffer chunk.

Capture 510 captures packets in a specific receive queue. The capture operation is performed in the units of the packet buffer chunk; a single operation can move multiple chunks to the user space. To capture a packet buffer chunk to user space, only its metadata {{nic_id, ring_id, chunk_id}, process_address, pkt_count} is passed. The chunk itself is not copied. Here, pkt_count counts the number of packets in the chunks. When a packet buffer chunk attached to the receive ring is captured to the user space, the corresponding descriptor segment must be attached with a new "free" chunk to receive subsequent packets. Because the NIC moves incoming packets to the empty ring buffers without CPU intervention, a packet buffer chunk cannot be safely moved unless it is full. Otherwise, packet drops might occur. Thus, the capture operation works as follows: (1) if no packet is available, the capture operation will be blocked until incoming packets wake it up; (2) else if full packet buffer chunks are available, the capture operation will return immediately, with one or multiple full chunks moved to the user space, and the corresponding descriptor segment will be attached with a new "free" chunk; (3) else, the capture operation will be blocked with a timeout. The process will continue as stated in (2) if new full packet buffer chunks become available before the timeout expires. If the timeout expires and the incoming packets only partially fill an attached packet buffer chunk, it is copied to a "free" packet buffer chunk, which is moved to the user space instead. This mechanism avoids holding packets in the receive ring for too long.

Packet processing occurs at step 515 as described in the embodiments throughout.

In the user space, once the data in a "captured" packet buffer chunk are finally processed, the chunk will be recycled, at Recycle 520 for future use. To recycle a chunk, its metadata are passed to the kernel, which can be strictly validated and verified; the kernel simply changes the chunk's state to "free".

Close 525 closes a specific receive queue for packet capture and performs the necessary cleaning tasks according to known methods.

Through the capture and recycle operations associated with a ring buffer pool shown in FIG. 5, each chunk of packet buffers can be used to receive packets flowing through the network and temporarily store received packets. It should therefore be understood that a ring buffer pool's capacity is configurable. When a large pool capacity is configured, the ring buffer pool can provide sufficient buffering at the NIC's receive ring level to accommodate short-term bursts of packets. Thus, it helps to avoid packet drops.

In another embodiment, a new and unique traffic offloading method and system for computer packet engines to eliminate packet loss resulting from long-term load imbalance is disclosed.

Figure 6:
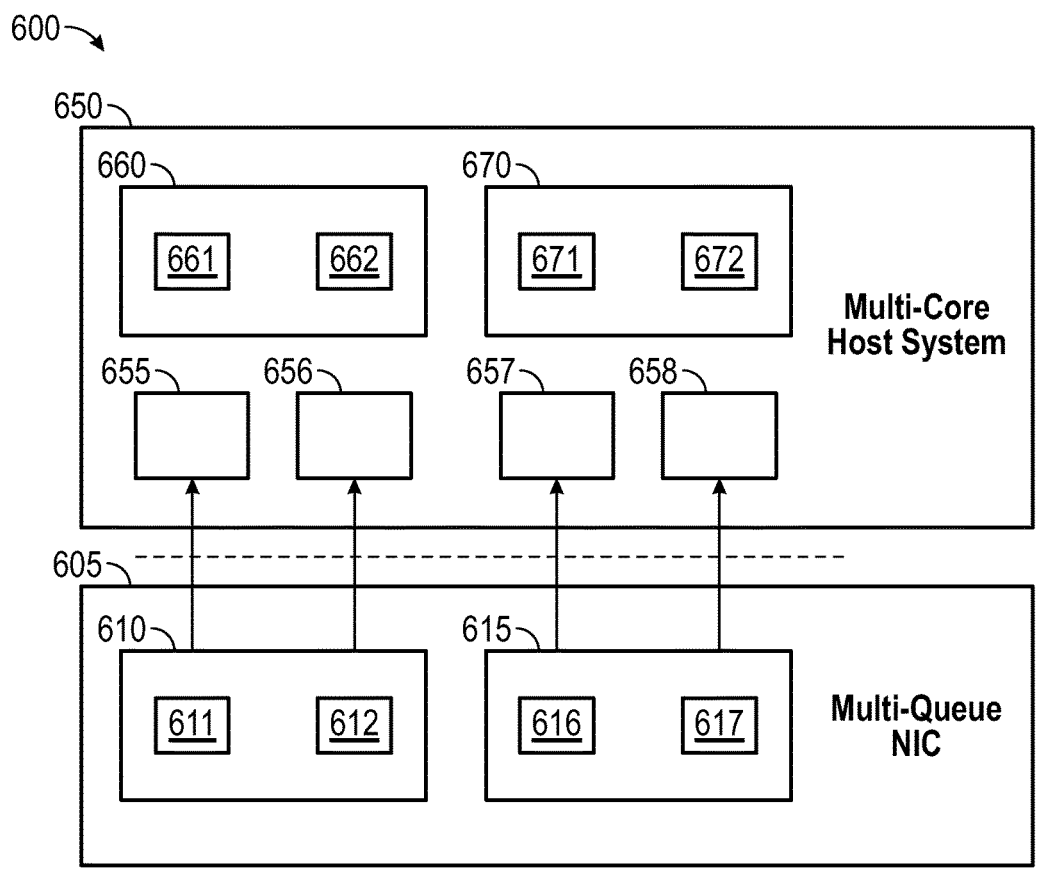
FIG. 6 depicts a block diagram of a buddy group system in accordance with an exemplary embodiment.

FIG. 6 illustrates a block diagram of a buddy group system 600. The buddy-group-based offloading mechanism is designed to eliminate packet loss resulting from overloaded CPUs. The basic concept is as follows: a busy packet capture engine offloads some of its traffic to less busy or idle queues (cores) where it can be processed by other threads. The challenge is to preserve application logic; traffic belonging to the same flow must be delivered to the same application when multiple applications are running in the system. Therefore, in one embodiment, the buddy group system 600 and associated methods can be used to solve this problem. The receive queues accessed by a single application can form a buddy group and traffic offloading is only allowed within a buddy group.

In the buddy group 600 framework, each receive queue 611, 612, 616, and 617 in the multi-queue NIC 605, is tied to a distinct core 655, 656, 657, and 658, respectively. The Multi-Core host system 650 includes a first application 660 that has two threads 661 and 662 running at core 655 and core 656. A second application 670 has threads 671 and 672 running at core 657 and 658, respectively. In this example, receive queue 611 and receive queue 612 can form a buddy group 610 to implement the offloading mechanism for application 660. Similarly, receive queue 616 and receive queue 617 can form a buddy group 615 to implement the offloading mechanism for application 670. It should be understood that the example in FIG. 6 is exemplary and any number of associated receive queues, buddy groups, cores, threads, and applications may be used.

Figure 7:
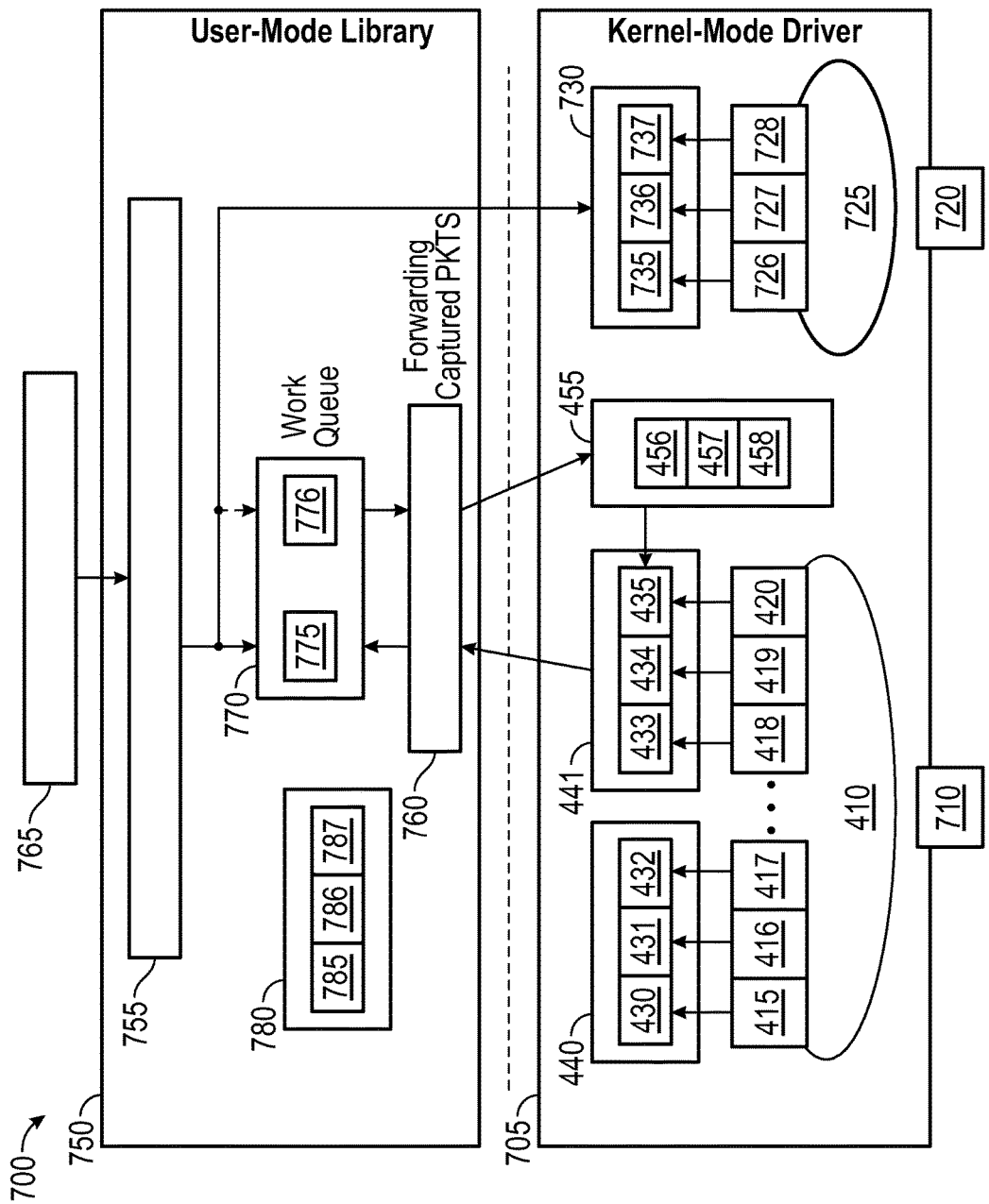
FIG. 7 depicts a block diagram of a WireCAP system in accordance with an exemplary embodiment.

In another embodiment, a method and system for computer packet capture engines provides lossless zero-copy packet capture and delivery. FIG. 7 illustrates a block diagram 700 associated with the methods and systems known as "WireCAP." At a high level it includes a kernel-mode driver 705 and a user-mode library 750.

The kernel-mode driver 705 manages NICs and provides low-level packet capture and transmit services. It applies the ring-buffer-pool systems and methods as disclosed herein to handle short-term load imbalance.

The user-mode library 750 extends and builds upon the services provided by the kernel-mode driver 705 and executes several mechanisms: it provides a Libpcap-compatible interface 755 for low-level network access, and it applies the buddy-group-based offloading mechanism to handle long-term load imbalance.

WireCAP system 700 captures packets on a per-receive-queue basis. When a user-space application opens a receive queue such as receive queue 710 to capture packets, the kernel-mode driver 705 maps the ring buffer pool associated with the receive queue into the application's process space, and the user-mode library 750 creates and assigns three key entities in the user space for the receive queue 710. First, a capture thread 760 performs the low-level capture and recycle operations, and implements the offloading mechanism. Typically, a capture thread 760 and an application thread 765 do not run in the same core. The system can dedicate one or several cores to run all capture threads.

A work queue 770 has a work-queue pair comprising a capture queue 775 and, a recycle queue 776. A capture queue 775 keeps the metadata of captured packet buffer chunks and a recycle queue 776 keeps the metadata of packet buffer chunks that are waiting to be recycled.

Finally, a buddy list 780 keeps the buddies 785, 786, and 787 of a receive queue in a buddy group. It is used to implement the buddy-group-based offloading mechanism. The receive queues in a buddy group are buddies. The user-mode library 750 provides functions to allow an application to populate the buddies of a receive queue.

The embodiments disclosed herein capture packets in two modes—a basic mode and an advanced mode.

Figure 8A:
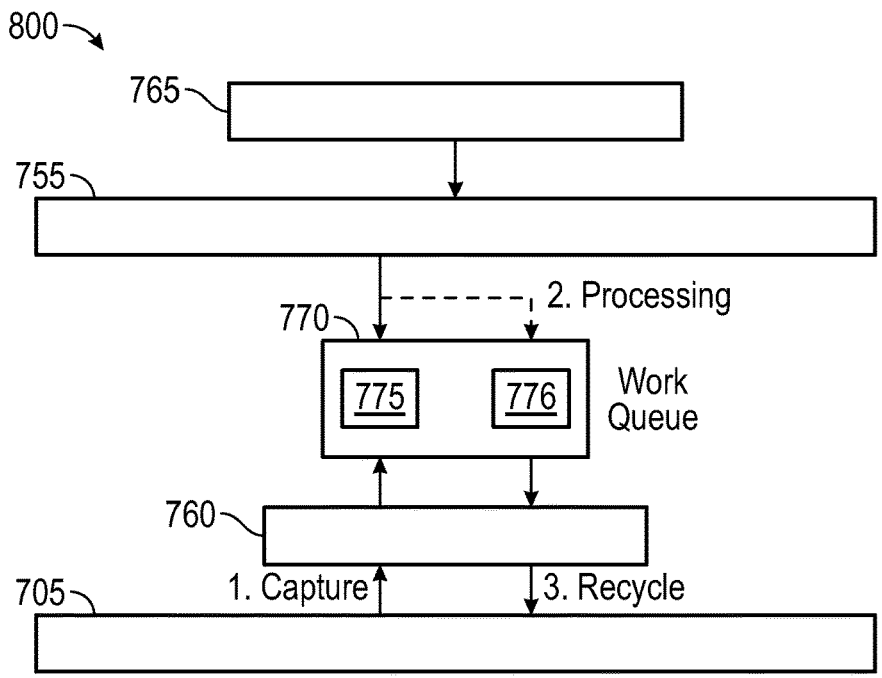
FIG. 8A depicts a block diagram of a basic mode implementation of methods disclosed herein in accordance with an exemplary embodiment.

The basic mode is illustrated in block diagram 800 shown in FIG. 8A. In basic mode, the WireCAP system handles each receive queue independently. For each receive queue, its dedicated capture thread 760 executes the low-level capture operations to move filled packet buffer chunks into the user space. The packet buffer chunks captured from a particular receive queue are placed into its capture queue 775 in the user space. To ingest packets from a particular receive queue, a packet-processing thread 765 accesses the receive queue's capture queue 775 in the user space through a Libpcap-compatible API 755 such as pcap_loop( ) or pcap_dispatch( ). Packet buffer chunks in the capture queue 775 are processed one by one; a used packet buffer chunk is placed into the associated recycle queue 776. A capture thread 760 executes the low-level recycle operations to recycle used packet buffer chunks from its associated recycle queue 776.

Figure 8B:
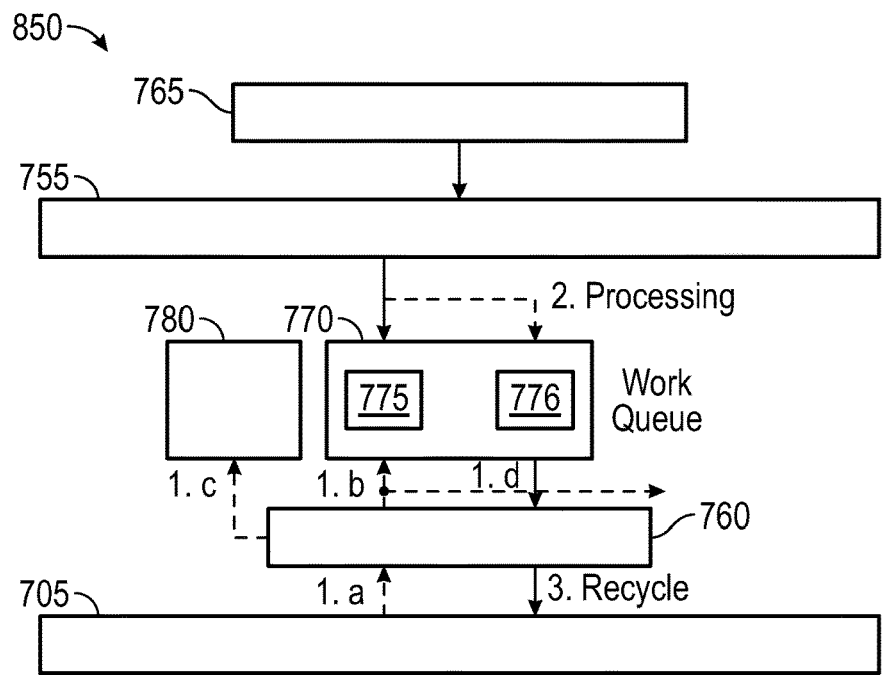
FIG. 8B depicts a block diagram of an advanced mode implementation of methods disclosed herein in accordance with an exemplary embodiment

In the advanced mode illustrated in block diagram 850, the WireCAP system updates the basic mode operations of block diagram 800 with the buddy-group-based offloading mechanism to handle long-term load imbalance. FIG. 8B illustrates this embodiment. For each receive queue, its dedicated capture thread 760 executes the low-level capture operations to move filled packet buffer chunks into the user space. When a capture thread 760 moves a chunk into the user space, the thread examines its associated capture queue 775 in the user space. If the queue length does not exceed an offloading percentage threshold (T), an indicator of long-term load imbalance, the thread will place the chunk into its own capture queue 775. When the threshold T is exceeded, the thread will query the associated buddy queue list 780 and place the chunk into the capture queue of an idle or less busy receive queue. The assumption is that, when a capture queue is empty or shorter, the corresponding core is idle or less busy.

A ring buffer pool can thus be mapped into an application's process space and a network packet can be captured and delivered to the application with zero-copy.

Figure 9:
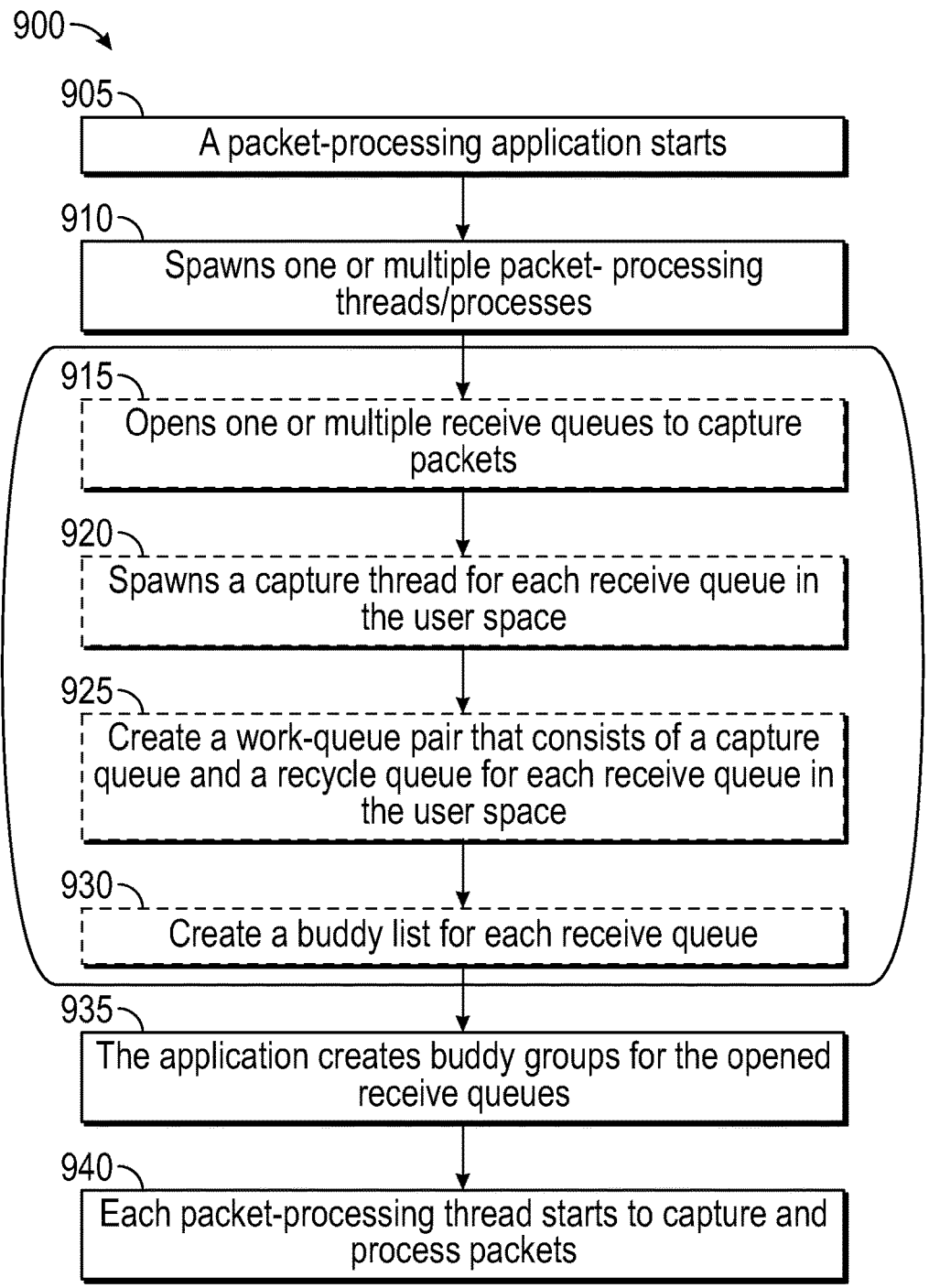
FIG. 9 depicts logical operational steps associated with an initialization method in accordance with an exemplary embodiment.

FIG. 9 illustrates an initialization flow chart 900 of logical operational steps for a packet processing application in accordance with the embodiments disclosed herein. After a packet-processing application starts as indicated at step 905, one or more packet-processing threads are spawned as shown at step 910. As depicted at step 915, one or more receive queues to capture packets are opened. This spawns a capture thread as shown at step 920 for each receive queue in the user space. As described at step 925, a work queue pair is then created that includes a capture queue and a recycle queue for each receive queue in the user space. A buddy list is created as depicted at step 930 for each receive queue. As illustrated at step 935, the application then creates buddy groups for the opened receive queues. Each packet-processing thread starts to capture and process packets as shown at step 940.

Figure 10:
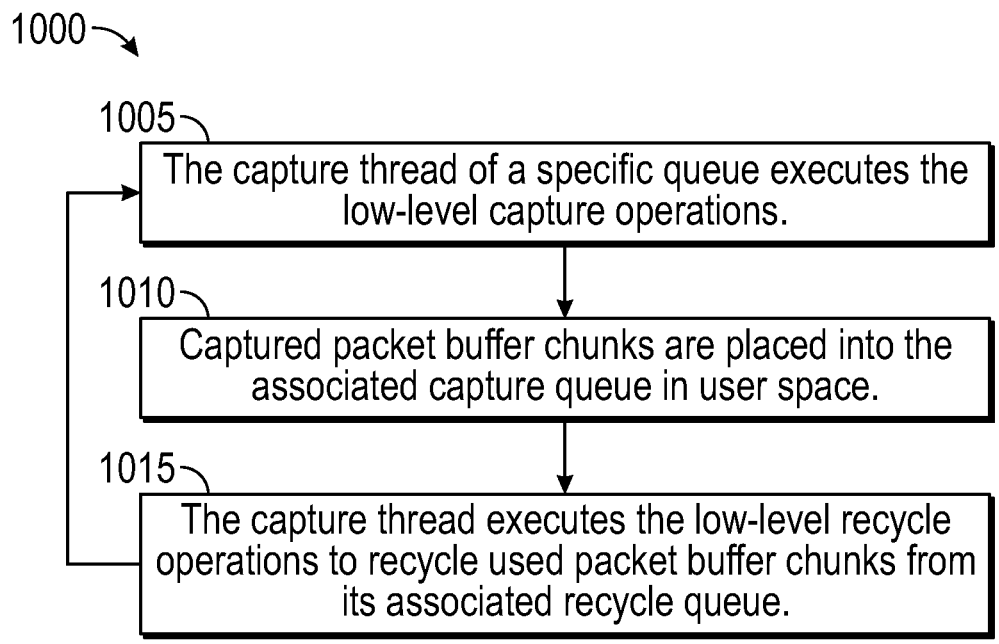
FIG. 10 depicts logical operational steps associated with a method for thread capture in basic mode in accordance with an exemplary embodiment.

FIG. 10 illustrates a flow chart 1000 of logical operational steps associated with a method of capture thread in basic mode. First, as shown at step 1005, the capture thread of a specific queue executes the low-level capture operations. The captured buffer chunks are then placed into the associated capture queue in the user space 1010. The capture threads can then execute the low-level recycle operations to recycle used packet buffer chunks from its associated recycle queue as illustrated at step 1015 so that the packet buffer chunks can be used for additional capture operations.

Figure 11:
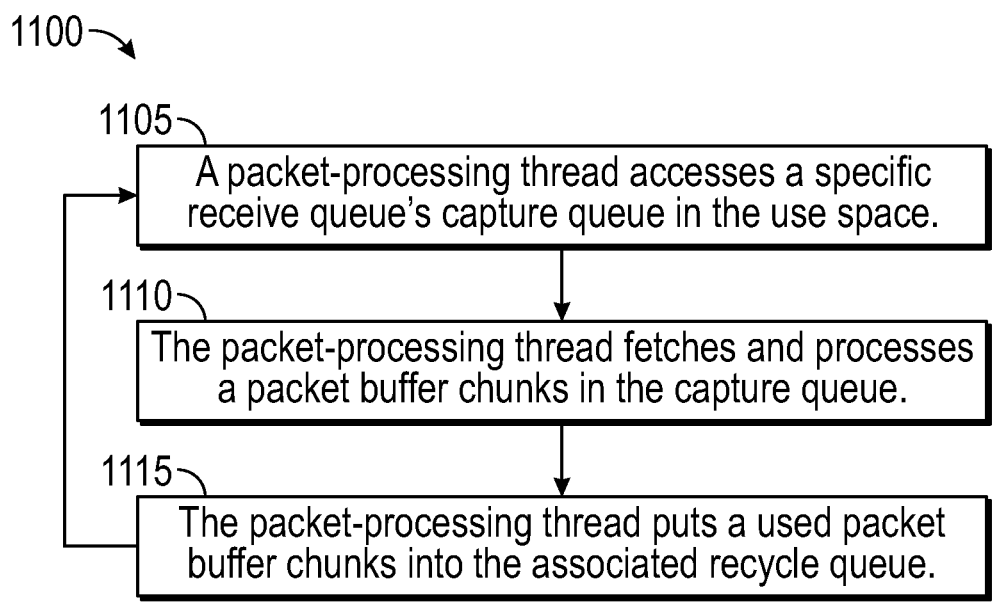
FIG. 11 depicts logical operational steps associated with a method for thread capture in basic/advanced mode in accordance with an exemplary embodiment.

FIG. 11 illustrates a flow chart 1100 of logical operational steps associated with a method of capture thread in advanced mode. A packet-processing thread in advanced mode operates in much the same manner as in basic mode. A packet processing thread accesses a specific receive queue's capture queue in the user space as shown at step 1105. The packet processing thread fetches and processes packet buffer chunks in the capture queue as indicated at step 1110. The packet-processing thread puts used packet buffer chunks into the associated recycle queue as shown at step 1115 so that the packet buffer chunks can be used for additional capture operations.

Figure 12:
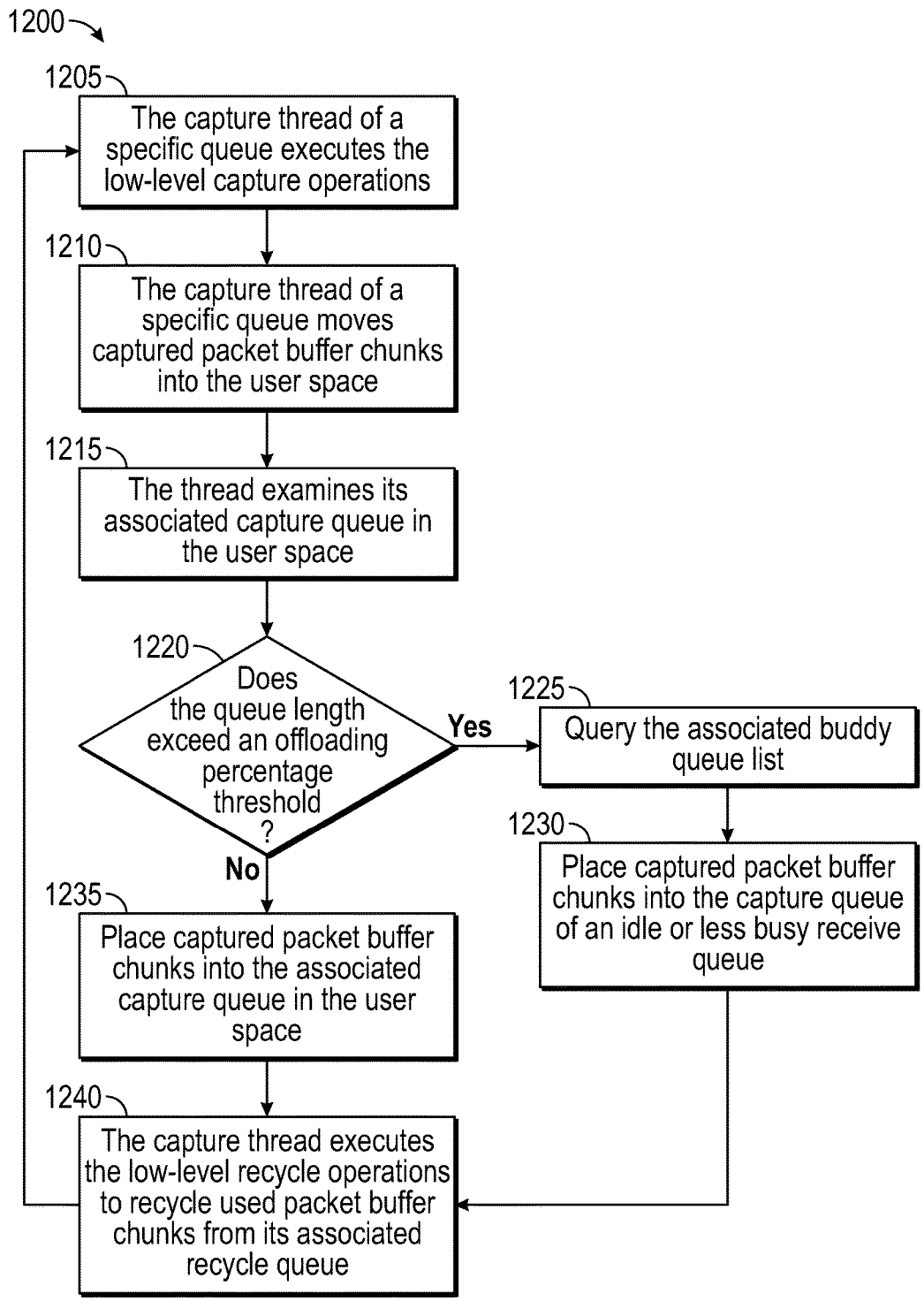
FIG. 12 depicts logical operational steps associated with a method for thread capture in advanced mode in accordance with an exemplary embodiment.

FIG. 12 illustrates logical operational steps associated with a method for a capture thread in advanced mode. First, as shown at step 1205, a capture thread of a specific queue executes the low-level capture operations. The capture thread of a specific queue moves captured packet buffer chunks into the user space as shown at step 1210. The thread examines its associated capture queue in the user space as illustrated at step 1215. Decision block 1220 relates to a determination of whether the queue length exceeds an offloading percentage threshold. If the queue length exceeds an offloading percentage threshold, the associated buddy list is queried as depicted at step 1225 and the captured packet buffer chunks are placed into the capture queue of an idle or less busy receive queue as illustrated at step 1230. The capture thread then executes the low-level recycle operations to recycle used packet buffer chunks from its associated recycle queue as shown at step 1240.

If the queue length does not exceed the offloading percentage threshold as shown at decision block 1220, at step 1235 the captured packet buffer chunks are placed into the associated capture queue in the user space. The capture thread then executes the low-level recycle operations as illustrated at step 1240 to recycle used packet buffer chunks from its associated recycle queue.

In another embodiment, an integral method and system for computer packet capture via a packet capture engine can be used to analyze, modify, and subsequently forward ingested network data packets back into the network.

A multi-queue NIC can be configured with one or multiple transmit queues for outbound packets. Embodiments are illustrated in FIG. 7. For each transmit queue 720, the NIC maintains a ring of transmit descriptors 726, 727, and 728, called a transmit ring 725. To transmit a packet from a transmit queue 720, the packet can be attached to a transmit descriptor 726, 727, or 728 in the transmit ring 725 of the queue. The transmit descriptor helps the NIC locate the packet in the system. After that, the NIC transmits the packet to a packet buffer chunk 730 with cells 735, 736, and 737.

In the disclosed embodiments of WireCAP, an application can use ring buffer pools as its own data buffers and handle captured packets directly from there. Therefore, the application can forward a captured packet by simply attaching it to a specific transmit queue 720, potentially after the packet has been analyzed and/or modified. Attaching a packet to a transmit queue only involves metadata operations. The packet itself is not copied.

Figure 13:
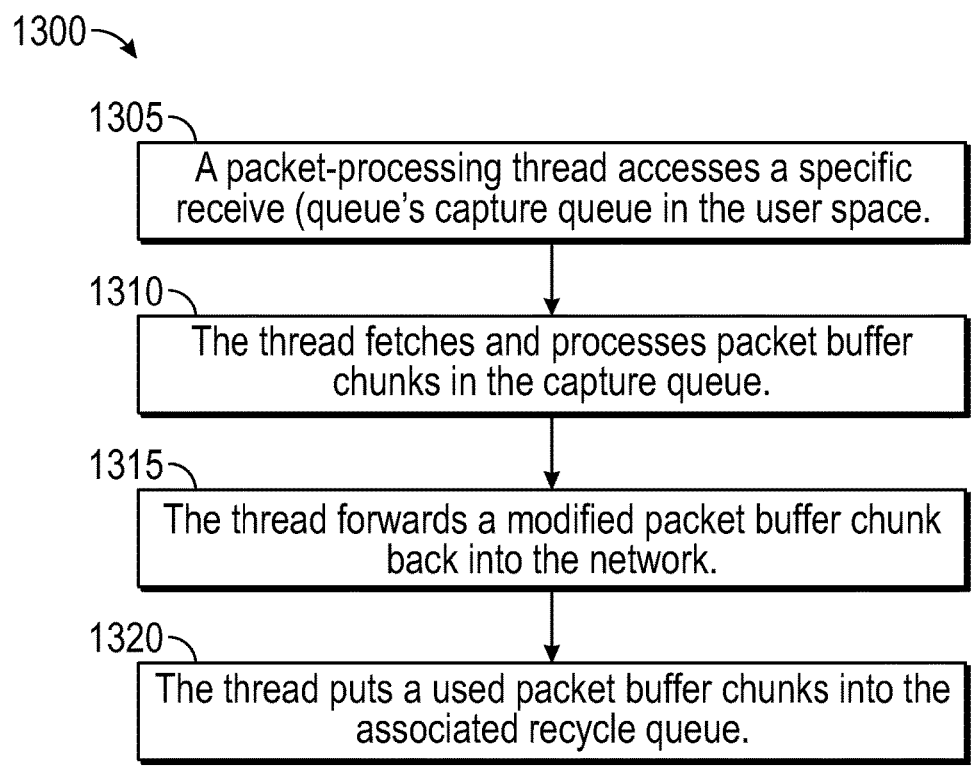
FIG. 13 depicts logical operational steps associated with a method for a packet-processing thread to analyze, modify, and subsequently forward ingested network data packets back into a network in accordance with an exemplary embodiment.

Logical operational steps associated with a method 1300 for a packet-processing thread to analyze, modify, and subsequently forward ingested network data packets back into a network are shown in FIG. 13. At step 1305, a packet processing thread access a specific receive queue's capture queue in the user space. The thread fetches and process packet buffer chunks in the capture queue as illustrated at step 1310. At step 1315, the thread forwards a modified packet buffer chunk back into the network, and the thread puts used packet buffer chunks into the associated recycle queue as shown at step 1320.

Based on the foregoing, it can be appreciated that a number of embodiments, preferred and alternative, are disclosed herein. For example, in one embodiment, a method for packet capture comprises opening at least one receive queue for packet capture; capturing packets in at least one chunk in the at least one receive queue; processing the captured packets; recycling the at least one chunk associated with the captured packet for future use; and closing the receive queue.

In another embodiment, the method further comprises forming at least one buddy group comprising at least two of the receive queues wherein the buddy group is configured as an offloading mechanism for an application associated with the at least two receive queues. The method also comprises providing low-level packet capture and transmit services using a kernel-mode driver; and providing an interface for low-level network access.

In another embodiment; the method further comprises assigning three modules in a user space for the at least one receiving queue comprising a capture thread, a work queue pair, and a buddy list. In an embodiment; the method further comprises accessing one of the at least one receive queue's capture queue in the user space with a packet processing thread; fetching and processing at least one packet buffer chunk in the capture queue; forwarding the modified at least one packet buffer chunk back into a network; and inserting the modified at least one packet buffer chunk into an associated recycle queue.

In another embodiment, the method further comprises determining if a queue length exceeds an offloading percentage threshold, querying a buddy queue list, and placing the at least one packet buffer chunk into a capture queue of a less busy capture thread.

In yet another embodiment, the method comprises handling each of the at least one receive queues independently in a basic mode. The at least one chunk comprises at least one of a free chunk; an attached chunk; and a captured chunk.

In another embodiment, a computer system for packet capture comprises at least one multi queue network interface card and at least one multi core host, the system configured to open at least one receive queue for packet capture, capture packets as at least one chunk in the at least one receive queue, process the captured packets, recycle the at least one chunk associated with the captured packet for future use, and close the receive queue.

In another embodiment of the system, it is further configured to form at least one buddy group comprising at least two of the receive queues wherein the buddy group is configured as an offloading mechanism for an application commonly associated with the at least two receive queues. The system is further configured to provide low-level packet capture and transmit services using a kernel-mode driver, and provide an interface for low-level network access.

In another embodiment, the system further comprises a capture thread, a work queue pair, and a buddy list. The system is further configured to access one of the at least one receive queue's capture queue in the user space with a packet processing thread, fetch and processing at least one packet buffer chunk in the capture queue, forward the modified at least one packet buffer chunk back into a network, and insert the modified at least one packet buffer chunk into an associated recycle queue.

In another embodiment, the system is further configured to determine if a queue length exceeds an offloading percentage threshold, query the buddy queue list, and place the at least one packet buffer chunk into the capture queue of a less busy capture thread.

In another embodiment, the system is further configured to handle each of the at least one receive queues independently in a basic mode. The chunks comprise one of a free chunk, an attached chunk, and a captured chunk.

In yet another embodiment, a packet capture system comprises at least one processor; a network interface card; a data bus coupled to the at least one processor and network interface card; and a computer-usable medium embodying computer code, the computer-usable medium being coupled to the data, the computer code comprising instructions executable by the processor configured for: opening at least two receive queues for packet capture, forming at least one buddy group comprising at least two of the receive queues wherein the buddy group is configured as an offloading mechanism for an application commonly associated with the at least two receive queues, capturing packets in at least one chunk in the at least two receive queues, processing the captured packets, recycling the at least one chunk associated with the captured packet for future use, and closing the receive queue.

In another embodiment, the system comprises a kernel-mode driver wherein the kernel-mode driver is configured for providing low-level packet capture and transmit services, and providing an interface for low-level network access. In another embodiment, the system further comprises a capture thread, a work queue pair, and a buddy list.

In another embodiment, the instructions are further configured for accessing one of the at least two receive queue's capture queue in a user space with a packet processing thread, fetching and processing at least one packet buffer chunk in the capture queue, forwarding the modified at least one packet buffer chunk back into a network, and inserting the modified at least one packet buffer chunk into an associated recycle queue.

It will be appreciated that variations of the above-disclosed and other features and functions, or alternatives thereof, may be desirably combined into many other different systems or applications. Furthermore, it can be appreciated that various presently unforeseen or unanticipated alternatives, modifications, variations or improvements therein may be subsequently made by those skilled in the art which are also intended to be encompassed by the following claims.

What is claimed is:

1. A method for improving packet capture comprising:
   partitioning a network interface card receive ring queue into at least one descriptor segment, each of said at least one descriptor segment containing a plurality of receive queue descriptors;
   mapping said at least one descriptor segment, containing received data packets, from said network interface card to a packet buffer chunk residing in kernel memory;
   copying said received data packets within said at least one descriptor segment into its associated packet buffer chunk;
   providing data packets in said packet buffer chunk to an executing application;
   recycling said at least one packet buffer chunk for future use;
   closing said descriptor segment; and
   forming at least one buddy group comprising at least two data receive queues wherein said buddy group is configured as an offloading mechanism for said executing application sharing said at least two data receive queues.

2. The method of claim 1 further comprising:
   providing low-level packet capture and transmit services using a kernel-mode driver; and
   providing an interface for low-level network access.

3. The method of claim 2 further comprising assigning three modules in a user space for said packet buffer chunk comprising:
   a capture thread;
   a work queue pair; and
   a buddy list.

4. The method of claim 3 further comprising:
   accessing one of said at least two data receive queue's capture queue in the user space with a packet processing thread;
   fetching and processing said packet buffer chunk in said capture queue;
   forwarding said modified packet buffer chunk back into a network; and
   inserting said modified packet buffer chunk into an associated recycle queue.

5. The method of claim 4 further comprising:
   determining if a queue length exceeds an offloading percentage threshold;
   querying a buddy queue list; and
   placing said packet buffer chunk into a capture queue of a less busy capture thread.

6. The method of claim 3 further comprising handling each of said at least two data receive queues independently in a basic mode.

7. The method of claim 1 wherein said packet buffer chunk comprises at least one of:
   a free chunk;
   an attached chunk; and
   a captured chunk.

8. A computer system for packet capture comprising:
   at least one multi queue network interface card and at least one multi core host associated with a computer, said system configured to:
   partition a network interface card receive ring queue into at least one descriptor segment, each of said at least one descriptors segments containing multiple receive queue descriptors;
   map said at least one descriptor segment, containing received data packets, from said network interface card to a packet buffer chunk residing in kernel memory;
   copy said received data packets within said at least one descriptor segment into its associated packet buffer chunk;
   provide data packets in said packet buffer chunk to an executing application;
   recycle said at least one packet buffer chunk for future use;
   close said descriptor segment; and
   form at least one buddy group comprising at least two of said data receive queues wherein said buddy group is configured as an offloading mechanism for an executing application sharing said at least two data receive queues.

9. The system of claim 8 wherein said system is further configured to:
   provide low-level packet capture and transmit services using a kernel-mode driver; and
   provide an interface for low-level network access.

10. The system of claim 9 further comprising:
    a capture thread;
    a work queue pair; and
    a buddy list.

11. The system of claim 10 wherein said system is further configured to:
    access one of said at least two data receive queue's capture queue in the user space with a packet processing thread;
    fetch and process said packet buffer chunk in said capture queue;
    forward said modified packet buffer chunk back into a network; and
    insert said modified packet buffer chunk into an associated recycle queue.

12. The system of claim 11 wherein said system is further configured to:
    determine if a queue length exceeds an offloading percentage threshold;
    query said buddy queue list; and
    place said packet buffer chunk into said capture queue of a less busy capture thread.

13. The system of claim 10 wherein said system is further configured to handle each of said at least two data receive queues independently in a basic mode.

14. The system of claim 8 wherein said packet buffer chunk comprise one of:
    a free chunk;
    an attached chunk; and
    a captured chunk.

15. A packet capture system comprising:
    at least one processor;
    a network interface card;
    a data bus coupled to said at least one processor and network interface card; and
    a computer-usable medium embodying computer code, said computer-usable medium being coupled to said data, said computer code comprising instructions executable by said processor configured for:
    partitioning a network interface card receive ring queue into at least one descriptor segment, each of said at least one descriptor segment containing a plurality of receive queue descriptors;
    mapping said at least one descriptor segment, containing received data packets, from said network interface card to a packet buffer chunk residing in kernel memory;

copying said received data packets within said at least one descriptor segment into its associated packet buffer chunk;

forming at least one buddy group comprising at least two of said data receive queues wherein said buddy group is configured as an offloading mechanism for an application commonly associated with said at least two data receive queues;

providing data packets in said packet buffer chunk to an executing application;

recycling said at least one packet buffer chunk; and closing said descriptor segment.

16. The system of claim 15 further comprising a kernel-mode driver wherein said kernel-mode driver is configured for:

providing low-level packet capture and transmit services; and providing an interface for low-level network access.

17. The system of claim 16 further comprising:

a capture thread;

a work queue pair; and a buddy list.

18. The system of claim 16 wherein said instructions are further configured for:

accessing one of said at least two data receive queue's capture queue in a user space with a packet processing thread;

fetching and processing said packet buffer chunk in said capture queue;

forwarding said modified packet buffer chunk back into a network; and inserting said modified packet buffer chunk into an associated recycle queue.

* * * * *